Oct. 17, 1939.  S. SEGAL  2,176,106
KEY CUTTING MACHINE
Filed Aug. 13, 1936   5 Sheets-Sheet 1
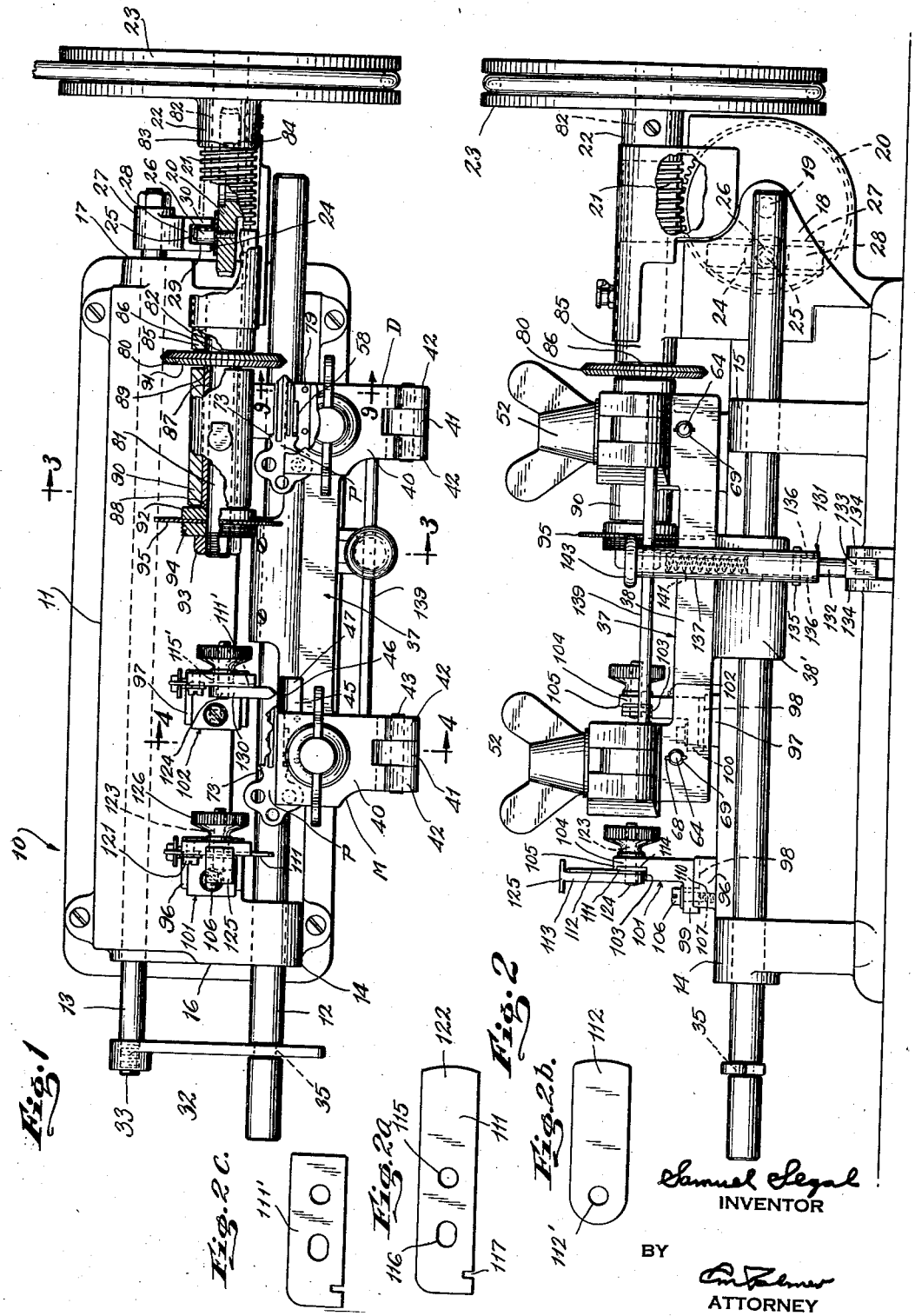
Samuel Segal
INVENTOR
BY
ATTORNEY

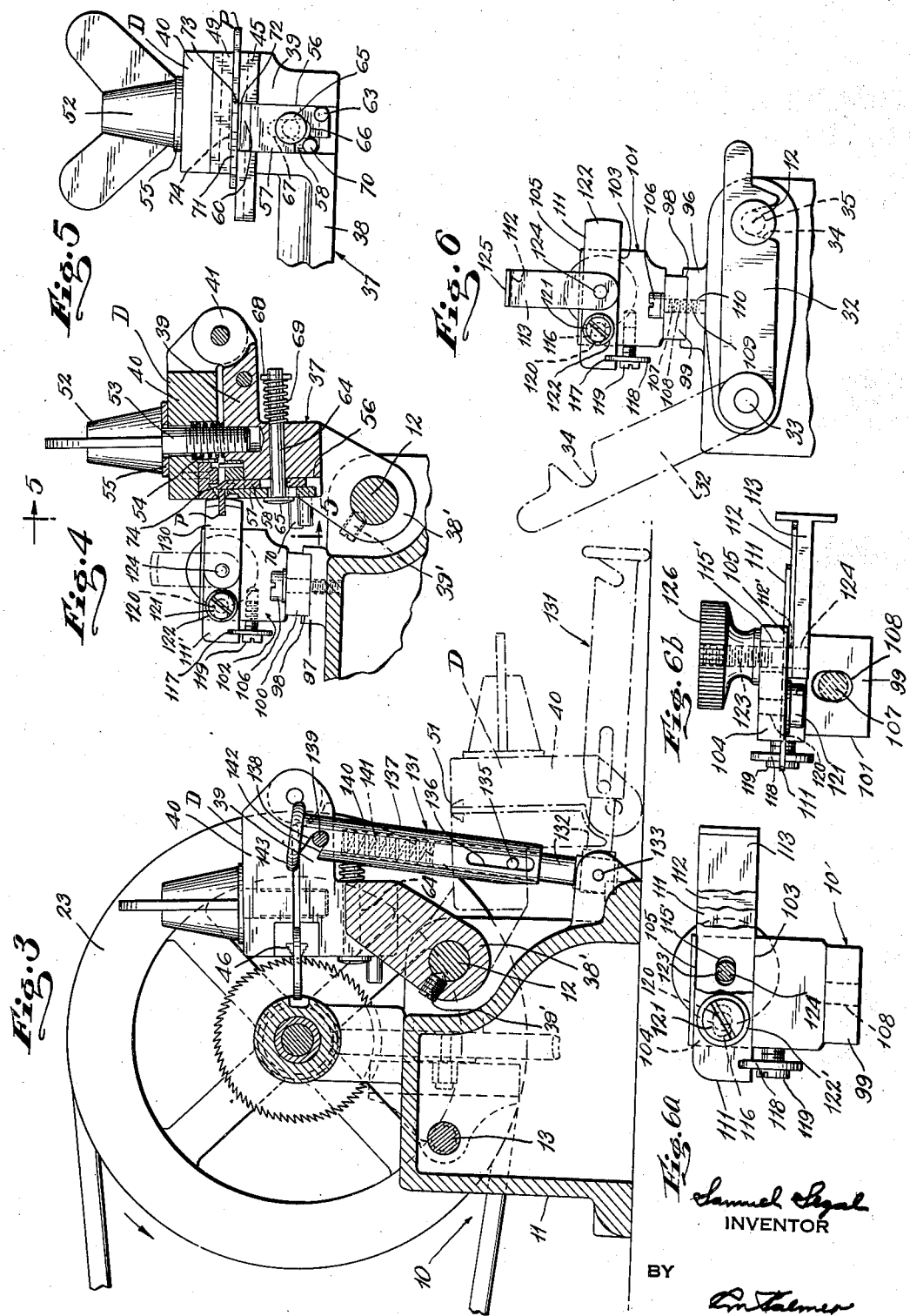

Oct. 17, 1939.  S. SEGAL  2,176,106
KEY CUTTING MACHINE
Filed Aug. 13, 1936  5 Sheets-Sheet 3
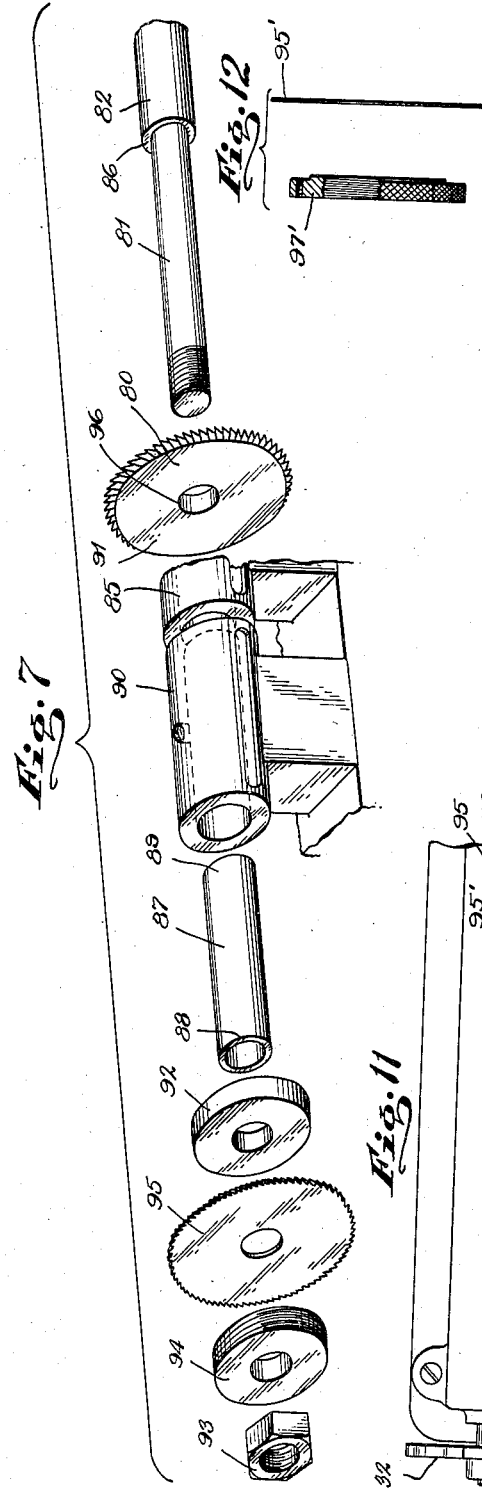
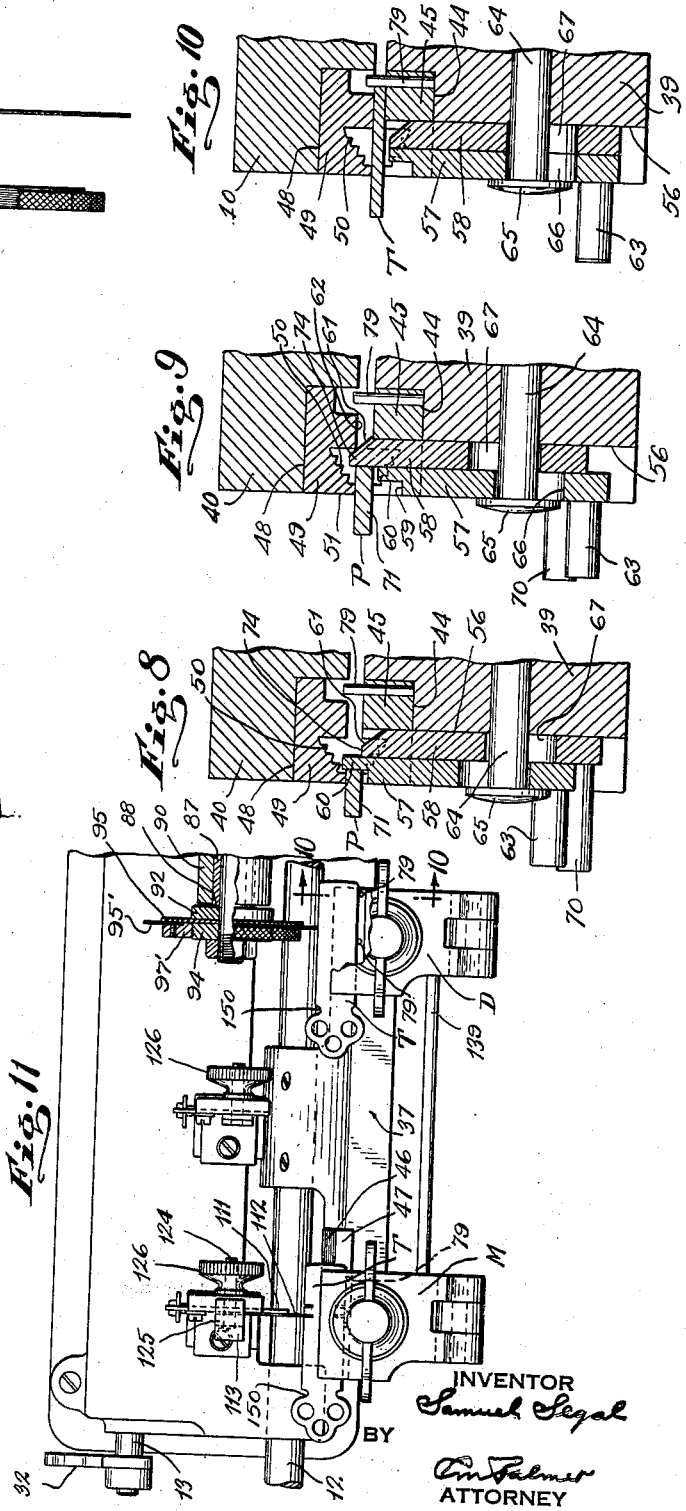
INVENTOR
Samuel Segal
BY
ATTORNEY

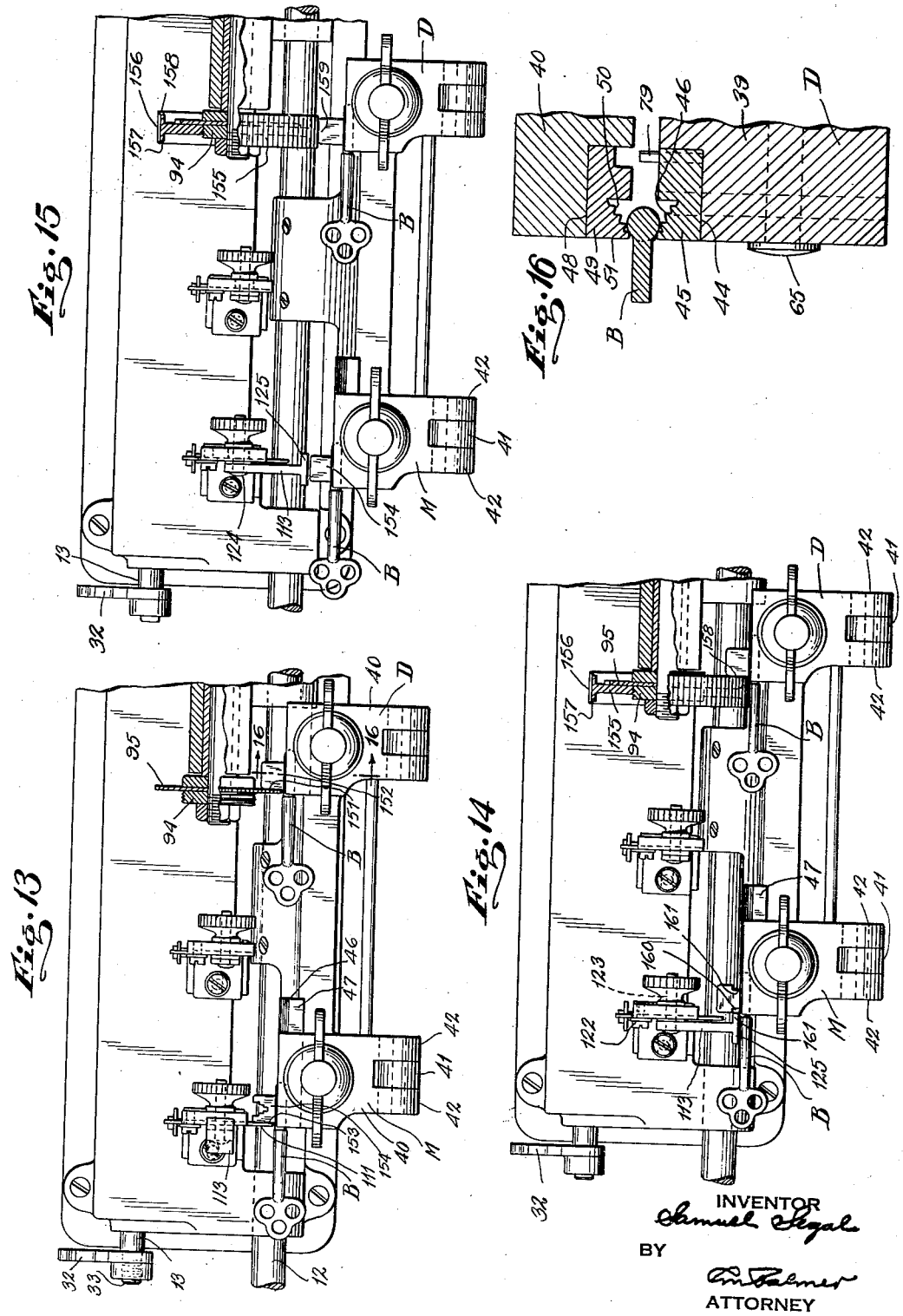

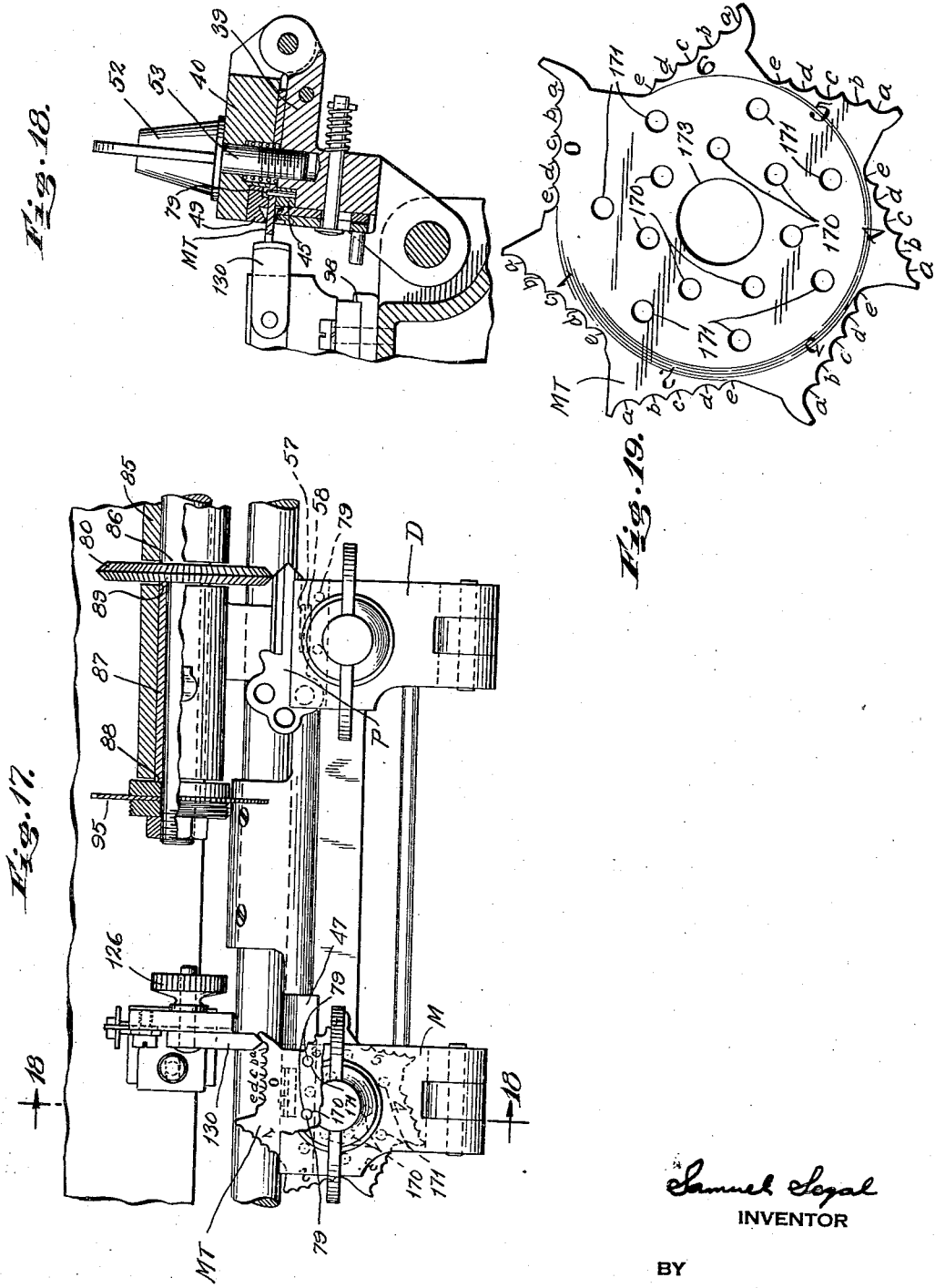

Patented Oct. 17, 1939

2,176,106

UNITED STATES PATENT OFFICE 2,176,106

KEY CUTTING MACHINE

Samuel Segal, Brooklyn, N. Y.

Application August 13, 1936, Serial No. 95,899

14 Claims. (Cl. 90—13.05)

The present invention relates to a key cutting machine of the type having a slidable and swingable carriage characterized by spaced clamps or vices for removably sustaining a previously cut key and a blank key in a predetermined relation in respect to a gage and cutting wheel. More particularly however the present invention deals with a key duplicating or cutting machine adapted to be manually or automatically controlled for cutting a blank key according to a predetermined combination of bitings of previosuly cut or master key. One object of the invention is realized in the provision of a simplified and improved key duplicating machine having swingable latch means for conveniently and disconnectably coupling the shiftable carriage to a reciprocating drive. The invention has as a further object the provision of novel settable means associated with each of the spaced vices of the horizontally shiftable carriage for appropriately supporting an inserted key within a respective vice. The invention also contemplates as an object the provision of spaced standards adjustable longitudinally relative to the supporting means or casing of the key duplicating machine for supporting gaging means adapted to be adjusted transversely of the casing and appropriately clamped in an adjusted set position. The invention has as a further object to provide a swingable clutch disconnectably associated with the slidable carriage and adapted to yieldingly sustain spaced clamped keys of the vices of the reciprocable carriage during automatic operation of the latter against a set gage or guide and its rotatable cutter. The invention further contemplates as an object the provision of spaced shaft supporting bearings defining a gap for removably receiving a cutter adapted to be frictionally sustained between a sleeve of one of the bearings and the driving shaft journalled in the other bearing. The invention further comprehends as an object the provision of an improved cutting machine for readily processing various types of blank keys in accordance with a certain order of bitings or grooves of a master key. The invention has as a further object the provision of a master template adapted to be utilized in place of a master or previously cut key in the matter of conforming a blank key to a predetermined combination of bitings.

The invention is applicable generally to key cutting or duplicating machines which may vary widely in respect to their general construction but preferably embodies a manually or automatically controlled carriage having clamping means for removably sustaining a pair of keys in a predetermined relation in respect to gaging means and a rotatable cutter. Such an improved key cutting machine is illustrated in the accompanying drawings in which:

Fig. 1 is a plan view of the key cutting machine according to my invention, shown partly in section and partly broken away.

Fig. 2 is a front elevational view of Fig. 1, shown partly broken away.

Fig. 2a is a side view of a gage or guide utilized in connection with a master key or master template.

Fig. 2b is a side view of another gage for relatively thin keys.

Fig. 2c is a side view of an adjustable member for setting an associated gage utilized in connection with a paracentric key.

Fig. 3 is an enlarged transverse sectional view taken on the line 3—3 of Fig. 1.

Fig. 4 is a sectional view on the line 4—4 of Fig. 1.

Fig. 5 is a fragmentary view of the carriage on the line 5—5 of Fig. 4.

Fig. 6 is a side view of Fig. 1, showing in full lines the disconnectable latch interlocked to reciprocate the carriage for automatic operation of the latter and showing in dash and dot lines, the latch uncoupled to permit manual displacement of the carriage.

Fig. 6a is a side view of one of the standards for supporting a plurality of gages which are illustrated partly broken away.

Fig. 6b is a plan view of the standard shown in Fig. 6a shown partly in section.

Fig. 7 is a view in perspective of the assembly for frictionally and disconnectably supporting the rotatable and spaced cutters.

Fig. 8 is a sectional view taken along the line 9—9 of Fig. 1, however, illustrating a rear or upper shiftable platform supporting a blank paracentric key.

Fig. 9 is a sectional view taken on the line 9—9 of Fig. 1, showing a blank paracentric key positioned on a shiftable forward or lower platform.

Fig. 10 is an enlarged sectional view taken along the line 10—10 of Fig. 11, particularly illustrating a relatively thin blank key supported between and clamped in a vice of the shiftable carriage.

Fig. 11 is a front elevational and fragmentary view of the key cutting machine illustrating spaced and relatively flat keys clamped in the vices.

Fig. 12 illustrates an elevational view, partly in section, of a relatively thin cutter and its supporting coupling.

Fig. 13 is a fragmentary elevational view of my cutting machine showing the manner in which bit or barrel keys may be set in a predetermined position.

Fig. 14 is a view similar to Fig. 13 illustrating the manner in which the sides of the tongue of a bit key may be notched or conformed to a previously cut or master key.

Fig. 15 is a view similar to Fig. 14 showing the manner in which another face of the tongue of a bit key is processed or cut.

Fig. 16 is an enlarged sectional view on the line 16—16 of Fig. 13.

Fig. 17 is a fragmentary elevational view of the machine in which an adjustable master template is utilized in connection with the gaging means for cutting a blank key according to a predetermined combination of bitings.

Fig. 18 is a sectional view on the line 18—18 of Fig. 17, and

Fig. 19 is a side elevational view of the master template.

Referring to the drawings the key duplicating machine is generally denoted 10 and comprises a relatively elongated casing or hollow support 11 having front and rear shafts 12 and 13 arranged to slide longitudinally of the casing. Particularly however front shaft 12 is slidably and rotatably guided in the longitudinally spaced ears or bearings 14 and 15 (Figs. 1 and 2) integral with and extending transversely of the casing. The rear shaft 13 is slidably guided in the sides 16 and 17 of the casing.

Extending upwardly from the casing and overhanging one side thereof is a shoulder 18 which has fixedly attached thereto a transversely disposed stub shaft 19 on which is rotatably retained worm gear 20 driven by worm 21 disconnectably coupled to hub 22 of pulley 23 which may be driven by a suitable prime mover, such as, a motor or the like not shown.

When rotated, worm 21 drives gear 20 and eccentrically secured to the latter is a disc 24. Extending from the eccentrically disposed disc 24 and attached to gear 20 is the headed crankpin 25. Rotatably mounted between the head of pin 25 and disc 24 is the collar 26. This collar is operatively connected to the crosshead 27 fixedly anchored to the rear shaft 13. It should be observed that crosshead 27 includes a yoke 28 defining a vertically disposed channel in which the rotatable collar 26 is disposed to cooperate with sides 29 or 30 during rotation of the pulley for reciprocating the rear shaft 13 relative to the casing 11.

According to the invention the front and rear shafts 12 and 13 may be disconnectably coupled. In this connection, a latch 32 has its rear end swingably mounted on and connected to the overhanging but reversely threaded terminal 33 of the rear shaft 13. The forward portion of latch 32 embodies a groove 34 adapted to removably receive reduced portion 35 of the front shaft 12.

When the latch is closed it lies substantially horizontally. In this relation groove 34 of the latch removably receives the reduced portion 35 of the front shaft, or in other words, parts of shaft 12 straddle or interlock with the sides of the swingable latch (Figs. 1, 2 and 6) thus removably coupling the front and rear horizontally arranged and slidable shafts 12 and 13. If therefore, the rear shaft is reciprocated, and the front and rear shafts are coupled together as described, the front shaft will be driven by the latch and correspondingly reciprocated.

Fixedly attached to the front shaft 12 is a carriage, broadly denoted 37. This carriage embodies a yoke shaped member comprising a relatively elongated base 38 having at each end an integrally extending overhanging jaw 39 and depending from base 38 is a sleeve or eye 38' which is held anchored to shaft 12 by means of set screws 39'.

Associated with each jaw 39 is a swingable clamping jaw 40. Each fixed jaw 39 of the yoke includes an ear 41 straddled by spaced ears 42 of its companion movable jaw 40. Intermediate ear 41 serves as a bearing for hinge pin 43 appropriately secured to a pair of spaced ears 42 straddling an associated ear 41. By the present arrangement a swivel connection is provided and therefore a clamping jaw 40 may be swung towards and away from an associated fixed jaw 39. For purposes of specification a swingable clamping jaw 40 and its fixed jaw 39 may be considered as a vice and as illustrated two are shown, the one at the left hand end for receiving a previously cut or master key being indicated M; and the one at the right hand end of the carriage for receiving a blank or uncut key to be duplicated or processed being denoted D.

Each of the fixed jaws 39 of the vices M and D includes a longitudinally disposed marginal recess 44 in which is secured a complementary gripping block 45 (Figs. 8 and 16) having a plurality of steps or teeth 46 disposed at an incline. In the case of the left hand vice M, block 45 is longer than the length of its vice and overhangs one side thereof. This overhanging portion is designated 47 (Figs. 1, 11 and 17).

The swingable jaw 40 of the vices M and D has a recess 48 in which the complementary gripping block 49 is appropriately fixed and retained. Each of the blocks 49 is provided with a plurality of steps or teeth 50 disposed at an incline relative to face 51 of its block 49 (see Fig. 16). Blocks 45 and 49 of each vice may be considered as complementary gripping members constituting in a closed position of its vice a diverging throat defined by the stepped or toothed facing surfaces which cooperate to grip the shank of a barrel shaped or bit key of the type shown in Figs. 13-16 inclusive. Complementary blocks 45 and 49 of each vice are preferably of relatively hard steel.

For adjusting a swingable jaw 40 of each vice in respect to its stationary jaw 39, a winged manipulator 52 is utilized. This manipulator is attached to a threaded shank 53 (Fig. 4) which passes loosely through the swingable jaw 40 and is threadably interconnected with an associated stationary jaw 39. A helicoidal spring 54 is in part retained within a recess of the swingable jaw and has a portion surrounding threaded shank 53 and abuts the companion fixed jaw 39. Also loosely surrounding shank 53 is a metal resilient washer 55 which is interposed between the manipulator 52 and the swingable jaw. By the present arrangement the swingable jaw of a vice may be readily adjusted relative to its companion fixed jaw by simply operating its manipulator 52 whereby the swingable jaw moves away from or towards the companion fixed jaw. If moved away from the latter spring 54 automatically causes the movable jaw to shift away from its fixed jaw and thus "open" these jaws to permit the insertion of a key. After such insertion has been made, the manipulator is actuated in an opposite direction to close the jaws to adequately grip the inserted key or key blank between the complementary gripping blocks 45 and 49.

Each of the fixed jaws of vices M and D is provided with a central recess 56 (Figs. 5 and 8) in which is slidably guided a pair of superimposed key supporting slidable key rests or platforms 57 and 58. Upper or outer platform 57 is provided with a recess 59 defining a marginal shoulder or lip 60 (Figs. 5 and 9). Lower or inner platform 58 includes an inclined face 61 (Fig. 9) cooperating with a stop lug or abutment 62 of the key gripping block 49' to limit displacement thereof.

Attached to each of the upper platforms 57 of both vices is a finger gripping post 63 which serves as a manipulator for displacing platform 57 relative to its associated platform 58. During such displacement platform 57 is also guided by shank 64 of a bolt 65 which is closely but movably straddled by the side walls of the guide slot 66 in platform 57 and hence the latter may be rectilinearly displaced relative to its companion platform 58 to extend beyond or overhang beyond block 45 of the fixed jaw as illustrated in Fig. 8. Platform 58 is also adapted to be rectilinearly guided by walls of a slot 67 thereof straddling its respective shank 64 which extends transversely of the carriage 37 and which is provided with a stop or pin 68 (Figs. 2 and 4). The heads of the bolts 65 of the vices are normally urged against the slidable platforms 57 by reason of helicoidal springs 69 surrounding a respective shank 64 of the bolts and abutting a front face of the casing 11 and its anchored pin 68. By this arrangement platform 57 is held yieldingly against its companion platform 58 and the latter against the bottom wall of recess 56. Accordingly platform 58 may be slidably displaced relative to its companion platform 57. To facilitate this operation each of the platforms 58 is provided with a post 70.

As shown in Figs. 4, 5 and 9, a relatively large paracentric key P is shown clamped between the complementary blocks 45 and 49. In this connection it will be noted that a marginal portion or lip 74 of platform 58 is extended between the blocks 45 and 49. This lip 74 is utilized to support the shank 71 of a relatively large paracentric key P and a side 72 (Fig. 5) of the lip 74 cooperates with lip 73 of the key P to set the latter after which the jaws of the vice may be adjusted to clamp the key in its set position. In Fig. 5, post 70 of platform 58 is in advance of post 63 of platform 57 and hence shoulder 60 is retracted and lip 74 of platform 58 is withdrawn.

According to the showing in Fig. 8, shoulder 60 of platform or key rest 57 is withdrawn and between the gripping blocks 45 and 49. This shoulder is utilized to set and support a relatively smaller paracentric key P. When platform 57 is extended, platform 58 is retracted and vice versa in the use of various sizes of paracentric keys to be clamped.

Where, however, it desired to process very large or thin keys T the latter are set in a predetermined position on the spaced pins or rests 79 secured to and extending from blocks 45 of the fixed jaws (Fig. 10) and in this connection both of the shiftable platforms 57 and 58 of both vices are retracted.

Now referring more particularly to the manner in which the cutting tool or wheel 80 is rotatably carried on shaft 81, it will be noted, that shaft 81 is provided with an enlarged shaft portion 82 (Fig. 7) which is fixedly attached to hub 22 of the pulley 23 (Figs. 1 and 2). Closely but slidably fitting over enlarged portion 82 of shaft 81 is the worm 21 which is in the form of a sleeve and is provided at one end with circumferentially arranged key means 83 (Fig. 1) removably fitting into cooperating keyway or recess 84 in the hub 22. Consequently if the pulley is rotated in either direction, the worm 21 is also rotated and ultimately therefore crosshead 27 is reciprocated.

The enlarged portion 82 of shaft 81 extends into the fixed bearing 85 of the casing. The enlarged portion 82 forms an annular shoulder 86 with shaft 81 (Fig. 7). This shoulder 86 overhangs one end of bearing 85 (Figs. 1, 2 and 17) and serves as an abutment or stop for an adjacent flat side face of the rotatable cutting wheel 80. The worm 21 removably keyed to hub 22 constitutes a spacer between hub 22 and one end of bearing 85 and after assembling shoulder 86 is automatically set to slightly overhang the opposite end of the bearing 85 as shown.

The cutting wheel 80 is closely although removably mounted on shaft 81 and clamped against annular shoulder 86 by a sleeve or supplementary bearing 87 (Figs. 1 and 17) disposed within and having its ends 88 and 89 overhanging the fixed bearing 90 of the casing. In assembly sleeve 87 is adapted to be slidably displaced longitudinally of bearing 90 and against an adjacent flat face 91 of the cutting wheel 80 by ring 92 abutting end 88 of the bushing 87 when the clamping nut 93 is moved against the exteriorly threaded ring 94 which in cooperation with ring 92 is utilized to clamp the cutter 95 also closely but removably mounted on shaft 81. It follows that cutters 80 and 95 are frictionally clamped and bodily rotate with shaft 81 during rotation of the pulley.

In assembling, the enlarged portion 84 of the shaft is first secured to the pulley. Worm 21 is slidably placed over enlarged portion 84 of the shaft and is interlocked with hub 22 of the pulley by the slot and key connection. Bushing or sleeve 87 is then slidably moved into the fixed bearing 90. Now cutting wheel 80 is interposed between the gap defined by the adjacent ends of the fixed bearings 85 and 90. Subsequently shaft 81 is projected or telescoped through the fixed bearings 85, the central aperture 96 of the cutting wheel 80 and into the supplementary bearing or bushing 87 until the worm 21 strikes bearing 85 at which time shoulder 86 overhangs bearing 85 and is disposed slightly within the gap defined by the fixed and upstanding bearings 85 and 90.

It will be observed that supplementary bearing 87 is slightly larger than the length of bearing 90 and therefore after cutting gear 80 has been positioned on shaft 81 as described and subsequently wheel 95 has been interposed between the clamping rings or washers 92 and 94, the nut 93, if manipulated, will cause ring 92 to abut overhanging end 88 of bushing 87 to slidably shift the latter until its end 89 slightly overhangs the other end of bearing 90 to project slightly into the gap between bearings 85 and 90 to abut against face 91 of the cutting wheel 80. Hence, it is apparent that upon manipulation of the clamping nut 93, cutting wheel 95 will be clamped between the removable rings 92 and 94 and the cutting wheel 80 will be frictionally clamped between the overhanging portion 89 of bushing 87 and the annular shoulder integral with shaft 81. In such clamped relation of cutting wheels or tools 80 and 95, rotation of shaft 81 will cause bodily rotation of the cutting wheels 80 and 95.

Integral with the casing or support 11 and extending upwardly therefrom are the spaced and similar tracks or channeled bosses 96 and 97 (Figs. 1, 4 and 5) each of which has a horizontal and longitudinal channel 98 for guiding bases 99 and 100 of the standards or brackets generally indicated 101 and 102 respectively each of which embodies a transversely disposed shoulder or step 103 at one side of a reduced portion 104 having an overhanging lip 105 (Figs. 2 and 6a).

Each of the standards 101 and 102 may be slidably moved longitudinally of the casing by loosening a respective clamping bolt 106 having its shank 107 disposed in a relatively larger or slightly elongated opening 108 (Figs. 6 and 6b) of an associated base while its lower portion 109 is threadably interconnected with threaded opening 110 of its respective track (Figs. 4 and 6).

Having unclamped the base of a standard from its track, the standard may be guidably shifted longitudinally of the casing and set to a new position within the limits of its associated enlarged or elongated opening 108 and pursuant to such adjustment the bolt 106 is tightened to clamp the base of the standard against its track.

Mounted on standard 101 are three juxtapositioned gages or guides 111, 112 and 113 (Figs. 2, 6 and 6a) for cooperating with paracentric, relatively flat or thin, and barrel or bit keys respectively. Gage 111 is adjustable in respect to its standard 101 in the channel 114 (Fig. 2) constituted by shoulder 103, reduced portion 104 and the overhanging lip 105 (Fig. 2). Gage 111 (Fig. 2a) comprises spaced openings 115 and 116 and the reentrant recess 117. Recess 117 receives an annular flange 118 (Figs. 6 and 6a) fixed to the set screw 119 whose shank is threadably connected to standard 101. By rotating set screw 119, gage 111 may be slidably displaced transversely of its standard. Such displacement is guided by the aid of shank 120 of a set screw 121 fitting into the elongated opening 116 of the body of the gage (Figs. 2a and 6a). If therefore set screw 119 is actuated, it will be apparent the forward portion 122 of gage 111 may be disposed to overhang its adjacent shoulder 103 in varying degrees. Having slidably adjusted gage 111, the latter is set in such position by clamping the head of set screw 121 against resilient washer 122' and the latter against the reduced portion 104 of the standard to which the shank of set screw 121 is threadably connected.

Intermediate gage 112 has its perforated end 112' (Figs. 2 and 2b) sustained on shank 123 of a fulcrum pin 124 to which is fastened the T shaped gage 113 which is provided with the rectangular head 125. Fulcrum pin 124 also passes through opening 115 of the adjustable gage 111 (Fig. 2a) and is slidably guided in the elongated slot 115' of the reduced portion 104 in its associated standard. Rotatable fulcrum pin 124 has its shank 123 overhanging its standard and adjustably mounted thereon is the rotatable knob or manipulator wheel 126 which is utilized as a clamping member for holding the swingable gages 112 and 113 in a clamped operative or inoperative position. By the present arrangement it will be apparent that standard 101 may be adjusted to shift gages 111, 112 and 113 bodily and longitudinally of the casing upon loosening of clamping set screw 106 and when wheel 126 is unclamped the gages 111, 112 and 113 may be bodily adjusted transversely of the casing by first unloosening set screw 121 and subsequently rotating the driving set screw 119.

With wheel 126 in an unclamped relation, it is appreciated that pin 124 may be shifted along the guide slot 115' of the standard. Since shank 123 of pin 124 fits into opening 112' of the swingable gage 112 and opening 115 of the gage 111 therefore any transverse displacement of the latter relative to the standard, will cause gages 112 and 113 to be correspondingly displaced. In effect shank 123 serves as a bearing for the swingable gage 112 which may be pivoted to a raised position and clamped or may be swung against shoulder 103 and clamped. Similarly when wheel 126 is unclamped, gage 113 may be swung to a raised position or disposed against shoulder 103. In the latter case shank 123 rotates relative to circular opening 112' of the swingable gage 112 and the standard and within elongated slot 115' in the latter.

According to the invention only gage member 130 is adjustably and swingably associated with standard 102 (Figs. 1 and 4). Apropos gage 111 shown associated with standard 101 (Fig. 1), this gage may be considered as a plate when resting against shoulder 103 (Fig. 2) and forwardly overhang this shoulder (Fig. 1). In connection with the standard 102, a similarly actuated plate 111' is shown but this plate is not used as a gage member and is just flush with the forward face of the standard 102 (Fig. 1). Otherwise it is identical in construction to gage 111 of standard 101 and is set and clamped by similar means identical to that shown in connection with standard 101. Gage 130 as in the case of gage 113 is also fixed to pin 124 which is journalled and guided in an elongated slot 115' in standard 102 and a rotatable clamping member 126 is utilized to clamp gage 130 in a set position, for example, in a gaging position as shown by the full lines in Fig. 4 or in an out of the way position illustrated by the dash and dot lines in Fig. 4.

With the present invention gage 112 is utilized in connection with the cutting wheel 95 or 97' for cutting relatively thin keys. Gage 111 is employed with cutter 80 for processing paracentric keys it being understood of course that a blank key is first set in vice D with respect to its cutter and subsequently the master key is so clamped in vice M that it is spaced from the blank key at predetermined distance equal to the distance between corresponding faces of its gage and companion cutting wheel.

Since the several gages 111, 112, 113 and 130 may be adjusted transversely of respective standards, their terminals may be readily set to be in the desired alinement relative to the cutting edge of its companion cutting wheel.

With the present invention provision has been made for disconnectably coupling the front slidable and rotatable shaft 12 to permit the latter to reciprocate with the rear slidable support shaft 13. In such coupled relation the carriage may be automatically supported to dispose the key and key blank clamped in vices M and D against a gage and the companion cutting wheel. In this connection, a swingable clutch generally denoted 131 is employed. This clutch comprises a swingable cylindrical rod 132 pivotally mounted on pin 133 fastened to spaced ears 134 projecting from the lower rim of the casing.

Secured to rod 132 is a pin 135. This pin overhangs rod 132 and projects into guide slots 136 of a slidable plunger 137 having at its upper part a biased or cam shaped groove 138 adapted to receive the longitudinally disposed fixed rod 139 interconnecting the fixed jaws 39 of the vices M and D.

Cylindrical plunger 137 is also provided with an axially disposed bore 140 in which is arranged a helicoidal spring 141. This spring abuts the end of rod 132 and the upper wall of bore 140 and thus its tendency is to normally hold the plunger 138 elevated. In Fig. 3, two positions of the carriage are illustrated. In the dash and dot line position, clutch 131 is uncoupled from rod 139 and the carriage is in an "open" position. In the full line position however the carriage is shown "closed" and yieldingly locked, that is, the keys clamped in the vices have a longitudinal edge at right angles to the vertical planes of the cutting wheel and its associated gage. By the expression "locked" is meant that the reentrant groove 138 has received the fixed rod 139 and that inclined lip 142 constituted by the lower face of groove 138 prevents disengagement of rod 139 and the plunger due to the action of spring 141.

Having adjusted the blank key with respect to a desired cutting wheel and the master key in respect to its gage, the blank key may be cut to be conformed to the edge contour of the master key either by manually shifting the carriage by manually sliding the front shaft relative the casing when latch 34 is disconnected or the carriage may be automatically reciprocated by throwing latch 34 into interlocking relation with the front shaft. When automatically driven the clutch 131 is coupled to the connecting rod 139 which is slidably guided in reentrant slot 138 as the carriage automatically reciprocates when the motor is driven.

With the power on and with the front and rear shafts latched together the carriage is yieldingly supported and retained by the clutch. In effect, the master key is a template and co-operates with its gage to permit the companion cutter to affect a corresponding contour of the master key into the blank key during reciprocation of the carriage, the action of spring 141 of the clutch being such as to yieldingly urge the key blank against the companion rotating cutter.

Having completed the processing of the previously blank key, the latch is disengaged or uncoupled from the front shaft, and the clutch is disconnected from the connecting rod 139. The latter operation is effected by pressing downwardly on head 143 of the plunger against the resistance of spring 141, thus permitting lip 142 to be free of rod 139. Consequently the clutch is released and may be swung away from the casing after which the carriage is rotated or dropped to set the same in its full open position as shown by the dash and dot lines in Fig. 3 in which case access may be conveniently had to the master and the duplicated key for removal thereof from respective clamping vices.

As illustrated in Figs. 1 and 2, a paracentric key P is clamped in the vices M and D. The key P clamped in vice M may be considered as the master or previously cut key and the key P in the vice D is a blank or uncut key. These keys are so positioned on platforms or shelves 58 in vices M and D that their lips 73 are a predetermined distance apart which corresponds to the distance between corresponding faces of gage 111 and the cutter 95. In conforming the blank to the master key, gage 130 and cutter 80 are utilized in the case of paracentric keys.

With pulley 23 rotating, the blank key may be cut to conform to the master key by either manually displacing the carriage longitudinally of the casing or automatically. In the former case, the carriage is lifted manually so that the blank key strikes the cutter 80 until limited by gage 130 by a corresponding biting or groove in the master key. Having completed cutting the blank to conform to one tooth of the master key, the carriage is slidably and manually displaced to the next biting or steps of the master key and the blank key is again brought against the cutter 80 which cuts the second biting in the blank to conform to the corresponding second biting in the master key under the influence of gage 130. In a similar fashion the other bitings of the master key may be cut in the blank key.

However manual control of the carriage may be eliminated and the carriage may be reciprocated automatically as previously pointed out after the master and blank keys are first positioned and subsequently clamped in their vices a predetermined distance apart. In this connection, the carriage is swung upwardly to present the keys before the required gage and cutter. The clutch is thrown to interconnect with connecting rod of the carriage. The keys therefore are yieldingly retained against the gage and cutter. With the pulley rotating, the latch 32 is thrown downwardly and as the rear rod 13 reciprocates, latch 32 will ultimately interlock with the front shaft causing the latter and its carriage to reciprocate. During such reciprocation of the carriage, the cutting tool cuts bitings in the blank key according to the bitings of the master key due to the limiting action of the gage in cooperation with the bitings of the master key.

Having conformed the blank to the master key, latch 32 is swung upwardly and away from the front shaft. The clutch is disconnected from the carriage and the keys may be removed from the vices. It should be observed, however, the overhanging portion 47 of the gripping block 45 of the fixed jaw 39 of vice M serves as a stop or ledge cooperating with the associated gage to limit movement of the carriage towards the cutter under the influence of the spring controlled clutch in the event the terminal of the shank of the key has travelled beyond the gage during reciprocation of the carriage.

According to the showing in Fig. 11 relatively thin and flat keys T are shown clamped in the vices M and D. First the key blank to be duplicated is set in vice D. This key is set against and on the spaced seats or pins 79, while the slidable platforms 57 and 58 are retained in retracted position (Fig. 10). Subsequently this blank is clamped in its vice. The master or previously cut key is then placed on pins 79 in vice M and arranged in such fashion that the distance between grooves 150 of the blank and master key correspond to the distance between corresponding faces of the swingable and set gage 112 and the cutter 95'. Held in a set predetermined position, the blank key may be cut by the aid of cutter 95' together with the master key T and gage 112 to conform the blank in accordance with the master key upon manual displacement of the carriage. In Fig. 11, the cutter 95' is relatively thin and requires external support. For this purpose it is fixedly attached to a coupling 97' threadably connected to clamping member 94. Cutter 95' cuts relatively narrow notches. Where wider notches are desired, coupling 97' with its cutter may be conveniently removed, and the cutter 95 is employed.

The vices or clamps M and D of the herein described cutting machine may be utilized to conform bit or barrel key in accordance with a certain order of bitings of a master bit or barrel key. In Figs. 13–16 a master bit key B is arranged in vice M and a blank bit key B is clamped in vice D. First corresponding parts of the keys are placed a predetermined distance apart. This is accomplished by inserting the blank bit key in vice D so that a vertical face 151 of its tongue 152 is against the thin cutter 95. In such set position the blank bit key is clamped in the gripping blocks 45 and 49 (Fig. 16) of the vice or clamp D. Thereafter the master bit key is inserted in vice M in such fashion that face 153 of tongue 154 is against gage 111. In such position the master key is clamped in vice D. Hence corresponding parts of the tongues of the master and blank bit keys are a predetermined distance apart. The carriage is then shifted step by step to permit the cutter 95 to conform the tongue 152 of the blank key to the contour of tongue 154 of the master key.

For conforming the tongues of a blank bit key to the tongues of a master bit key the T shaped gage 113 is swung to a horizontal position and clamped and a cutting wheel 155 is mounted on the exteriorly threaded clamping ring 94 (Fig. 15). Cutting wheel 155 is provided on its rim with teeth 156 which have effective cutting edges 157 and 158. The horizontal edges of teeth 156 are employed to cut face 159 of the tongue of the blank key to conform to the height of the tongue of the master key. In this connection the laterally extending head 125 of gage 113 is utilized as the gage or stop. The ends 157 of teeth 156 of the cutting wheel 155 are also utilized to conform the sides of the tongues of the blank key to the master key. For example the tongue of the master key (Fig. 14) is provided with side notches which are also made in the blank key by utilizing the side cutting edges 157 and 158 of the cutting wheel 156 while the terminal portions 161 of the lateral extensions 125 serve to limit the extent to which the blank key may be processed until it conforms to the master key.

Instead of employing a master key when processing a blank key, the present invention contemplates the utilization of a master template, generally denoted MT (Figs. 17–19). This master template is particularly useful when the bit combination of a master key is known but the latter may be unavailable or if available it is not desired to use the same. This master template comprises a plurality of angularly arranged rows of grooves or bitings designated respectively 0, 1, 2, 3, 4, 5 and 6. Each row may consist of five bitings or grooves, a, b, c, d and e. The bitings of each row have the same depth. For example, all the bitings, a, b, c, d and e of row "0" have the same depth, all the bitings a, b, c, d and e of row "1" are of the same depth but slightly deeper than the bitings of row "0", those of row "2" are of the same depth and slightly deeper than row "1", etc.

For each row of bitings there is provided a pair of openings 170 and 171 in the master template MT and the latter includes a relatively large central opening 173 adapted to loosely surround shank 53 of its manipulator 52 while a pair of openings 170 and 171 removably cooperate with the spaced pins 79 of vice M to hold a respective row of teeth in proper position in advance of the gripping blocks 45 and 49 of vice M to cooperate with gage 130.

Where the combination of bitings of a master key is known, this combination may be applied to a blank key in the use of the herein master template. For example, if it is assumed, that this hypothetical combination is 0, 1, 2, 3 and 4 and it is desired to use the master template to conform the blank key in vice D, this combination when read right to left is 4, 3, 2, 1, 0. The first biting on the master template therefore is on row "4", "a", biting; the second on row "3", "b" biting; the third on row "2", "c" biting; the fourth on row "1", "d" biting; and the last on row "0", "e" biting.

As in the case of the employment of a master key with a blank key which are always set apart a predetermined distance, the same holds true in the case of the master template and the blank key. In this connection the master template and the blank are clamped in the vices M and D a predetermined distance apart. However the master template is so rotated relative to shank 53 and subsequently positioned on the spaced pins 79 that bitings of row "4" are in advance of the jaws of its vice. Since the first biting of the combination is 4, the "a" biting in row 4 is therefore used as a gage in the cutting of a corresponding biting in the blank key P which may be on either of the platforms 57 or 58 or the spaced pins 79 in vice D.

Subsequently, the jaws of vice M are unclamped, the master template is removed from pins 79, and rotated to position row "3" of the bitings in advance of the jaws of this vice. Again the master template is placed on pins 79 and the jaws of the vice are clamped. Biting b of row "3" is then employed in the cutting of a corresponding biting in the blank key. Pursuant thereto, the master template is positioned and clamped in the vice until row "2" is in advance of the jaws and biting c of row "2" is used as a gage for making a similar biting in the blank. In a similar manner biting d of row "1" and biting e of row "0" are employed in connection with conforming the blank to the remaining parts of the combination of bitings. It is therefore apparent that with the present invention even though no master key is employed, a certain predetermined combination of bitings may be cut in a blank key.

Again referring to the cutter 80, it will be apparent that since it is frictionally sustained by annular shoulder 86 and the terminal 89 of the supplementary bearing 87, both of which extend into the gap defined by the spaced bearings 85 and 90 when assembled, cutter 80 may be readily detached or assembled. If assembled all that is required is to disconnect clamping member 93 from the threaded terminal of shaft 81 and the latter may be withdrawn from bearings 87 and 85 upon the application of an outwardly directed force on the pulley.

With shaft 85 withdrawn, the support for the cutter 80 is removed. Consequently since this cutter is also unclamped, it may be readily removed from the gap, permitting the insertion of a new cutter therein or permitting the cutter to be reversed where it is desired to direct the cut chips in another direction.

The superimposed and shiftable platforms 57 and 58 of each of the vices of the carriage provide means for appropriately supporting keys having shanks of various widths and the serrated or toothed and tapering throat defined by the complementary gripping blocks constitute means for properly clamping barrel or bit keys.

In the case of standards 101 and 102 each of the latter may be shifted longitudinally of the casing and clamped in a set position. The several gages on standard 101 may be simultaneously shifted transversely of the casing by first unloosening set screw 121 and associated clamping wheel 126 after which set screw 118 is actuated to displace gage 111 which in turn by reason of shank 123, gages 112 and 113 are correspondingly displaced.

Gage 112 is pivotally associated with shank 124 and if wheel 126 is unclamped, gage 112 may be swung relative to gage 113. By loosening wheel 126, gage 113 may be swung relative to either of the gages 111 and 112 since its fixed shank 123 is also rotatably disposed in the elongated opening 115' of its standard.

The herein disclosed and described embodiments have given satisfactory results and it will be obvious to those skilled in the art after an understanding of my invention that other changes and modifications may be made without departing from the spirit and scope of the invention and it is intended and it is to be understood that all matter contained in the above description and shown in the accompanying drawings, shall be interpreted as illustrative and not in a limiting sense.

I claim:

1. In a key cutting machine, a support having spaced bearings defining a gap, a cutter disposed in said gap, a rotatable shaft disposed longitudinally of said bearings and supporting said cutter, and bearing means in one of said bearings for clamping said cutter to bodily rotate with said shaft.

2. In a key cutting machine, a support having spaced bearings defining a gap, a cutter disposed in said gap, a rotatable shaft disposed longitudinally of said bearings and having a shoulder adapted to overhang one of said bearings to abut one face of said cutter, slidable means surrounding said shaft and adapted to abut another face of said cutter and means for clamping said slidable means against said cutter and said cutter against said shoulder to permit bodily rotation of said cutter with said shaft.

3. In a key cutting machine, a support having spaced members defining a gap, a cutter disposed in said gap, a rotatable shaft disposed longitudinally of said members and having a shoulder adapted to extend into said gap, means shiftable relative to said shaft, and means for frictionally clamping said shiftable means against the cutter and the latter against said shoulder to permit bodily rotation of said cutter with said shaft.

4. In a key cutting machine, a pair of spaced bearings defining a gap, a cutter removably disposed in said gap, a shaft for supporting said cutter and having a shoulder adapted to overhang one of said bearings and project into said gap, a slidable supplementary bearing member disposed in the other bearing of said pair and adapted to overhang said gap, spaced annular members mounted on said shaft, a cutter mounted on said shaft between said annular members, and means mounted on said shaft for clamping said second mentioned cutter between said annular members and said first mentioned cutter between said shoulder and said supplementary bearing member.

5. In a key cutting machine, spaced members defining a gap, a cutter disposed in said gap, a rotatable shaft for supporting said cutter, means projecting into said gap and slidably sustained within one of said members for frictionally and removably sustaining said cutter in said gap and against said shaft, and means for clamping said projecting means against said cutter to permit the latter to bodily rotate with said shaft.

6. In a key cutting machine, a support having a rotatable and slidable carriage comprising spaced clamps having selective shiftable means for supporting a master member and a blank member, a rotatable cutter, driving means for rotating said cutter, reciprocable means actuated by said driving means, a gage adjustable relative to said support, clutch means disconnectably associated with said reciprocable means for yieldingly holding said blank member against said cutter and said master member at times against said gage during reciprocation of said carriage, and disconnectable swingable means for locking said carriage.

7. In a key cutting machine, a support having spaced bearings defining a gap, a gage longitudinally and transversely adjustable relative to said support, a cutter in said gap, a shaft having an enlarged and reduced portion defining a shoulder adapted to extend into said gap, a supplementary bearing surrounding said reduced portion and adapted to extend into said gap, means for clamping said cutter between said supplementary bearing and shoulder to permit bodily rotation of said cutter with said shaft upon rotation of said shaft, a carriage having spaced clamps for removably supporting a grooved member and a blanked member, disconnectable means for yieldingly holding said carriage to position said blanked member against said cutter and said grooved member at times against said gage, and means for reciprocating said carriage during rotation of said shaft.

8. In a key cutting machine, a support, a gage adjustable relative to said support, a rod slidably guided by said support, a rotatable shaft, a cutter frictionally secured to said shaft, means for reciprocating said rod during rotation of said shaft, a member rotatably and slidably carried by said support, a carriage sustained by said member and comprising spaced vices for removably clamping a grooved and blanked member, a swingable clutch for holding said carriage elevated to dispose said blanked member against said cutter and said grooved member at times against said gage, and swingable coupling means carried by said slidably guided rod and having means for disconnectably interlocking with said member rotatably and slidably guided by said support during rotation of said shaft.

9. In a key cutting machine, a support, a gage selectively adjustable longitudinally and transversely of said support, a rod slidably guided by said support, a rotatable shaft, a cutter secured to said shaft, means for reciprocating said rod during rotation of said shaft, a member rotatably and slidably carried by said support, a carriage sustained by said member and comprising spaced vices comprising shiftable means for positioning a grooved and blanked member, a swingable resiliently controlled clutch for yieldingly holding said carriage elevated to dispose said blanked member against said cutter and said grooved member at times against said gage, and a latch swingably carried by said slidably guided rod and having means for interlocking with said rotatable and slidable member to reciprocate said carriage during rotation of said shaft.

10. In a key cutting machine, a rotatable shaft, a cutter mounted on said shaft, a carriage having spaced vices, shiftable means carried by said vices for sustaining a grooved member and a blanked member a predetermined distance apart corresponding to the distance between corresponding faces of said gage and cutter, means for yieldingly holding said blanked member against said cutter, and swingable means actuated upon rotation of said shaft for reciprocating said carriage relative to said gage and cutter.

11. In a key cutting machine, a support, a gage, means for adjustably sustaining said gage relative to said support, a rotatable shaft, a cutter frictionally connected to said shaft, a carriage having spaced vices for removably clamping a grooved member and a blanked member a predetermined distance apart corresponding to the distance between corresponding faces of said gage and cutter, means for reciprocating said carriage during rotation of said shaft, and swingable latching means for disconnectably coupling said carriage.

12. In a key cutting machine, a support having a track, a standard adapted to be guided longitudinally of said track, means for clamping said standard to said track, a plurality of gages displaceable transversely of said support and movably mounted on said standard, means for clamping said gages to prevent displacement thereof, and adjustable means cooperating with said gages for displacing the latter in an unclamped position thereof transversely of said support.

13. In a key cutting machine, a support having a track, a standard slidably guided by said support, means for adjustably clamping said standard to said track, a gage displaceable transversely of said support and movably mounted on said standard, means for clamping said gage to prevent displacement thereof relative to said standard, adjustable rotatable means interlocking with said gage to displace the latter transversely of said support, a plurality of juxtapositioned gages selectively swingable relative to said support, and means for clamping said plurality of juxtapositioned gages in a set position.

14. In a key cutting machine, a support having a track, a standard slidably guided by said support and longitudinally of the latter, means for adjustably clamping said standard to said track, a gage displaceable transversely of said support and movably mounted on said standard, means for clamping said gage to prevent displacement thereof relative to said standard, adjustable and rotatable means for displacing said gage transversely of said support, a plurality of juxtapositioned gages selectively swingable relative to said support, and means for clamping said plurality of juxtapositioned gages in a set position.

SAMUEL SEGAL.